United States Patent

Creuz

[15] 3,701,139
[45] Oct. 24, 1972

[54] APPARATUS FOR DETECTING INTERRUPTION IN THE CYCLIC MOVEMENT OF A MEMBER

[72] Inventor: Walter R. Creuz, Chatham, N.J.

[73] Assignee: Aero-Flow Dynamics, Inc. (The Wing Company Division), Linden, N.J.

[22] Filed: Sept. 17, 1970

[21] Appl. No.: 73,057

[52] U.S. Cl. .................................340/271, 324/168
[51] Int. Cl. ...........................................G08b 21/00
[58] Field of Search ......340/271, 58, 309.1; 324/168

[56] References Cited

UNITED STATES PATENTS

| 3,583,405 | 6/1971 | Gerhardt | 340/271 |
| 3,559,205 | 1/1971 | Colby | 340/271 |
| 3,281,810 | 10/1966 | Thornberg et al. | 340/309.1 |
| 3,611,343 | 10/1971 | Schoenbach | 340/271 |

Primary Examiner—John W. Caldwell
Assistant Examiner—Michael Slobasky
Attorney—Brooks, Haidt & Haffner

[57] ABSTRACT

A single-pole double-throw magnetic reed switch responds to the passage of one or more magnets on the periphery of a rotating air-to-air energy exchange wheel to signal through an interval timing circuit any interruption in wheel rotation even if a magnet stops adjacent the switch. Actuation of the reed switch couples a voltage pulse from a charge storage capacitor to a transistor for resetting the timing circuit to start another timing cycle. If a subsequent actuation of the switch does not occur before the timing circuit completes a timing cycle, the signalling device is energized.

1 Claim, 2 Drawing Figures

PATENTED OCT 24 1972 3,701,139
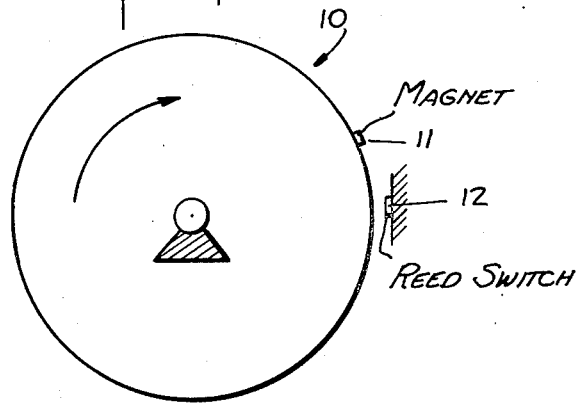
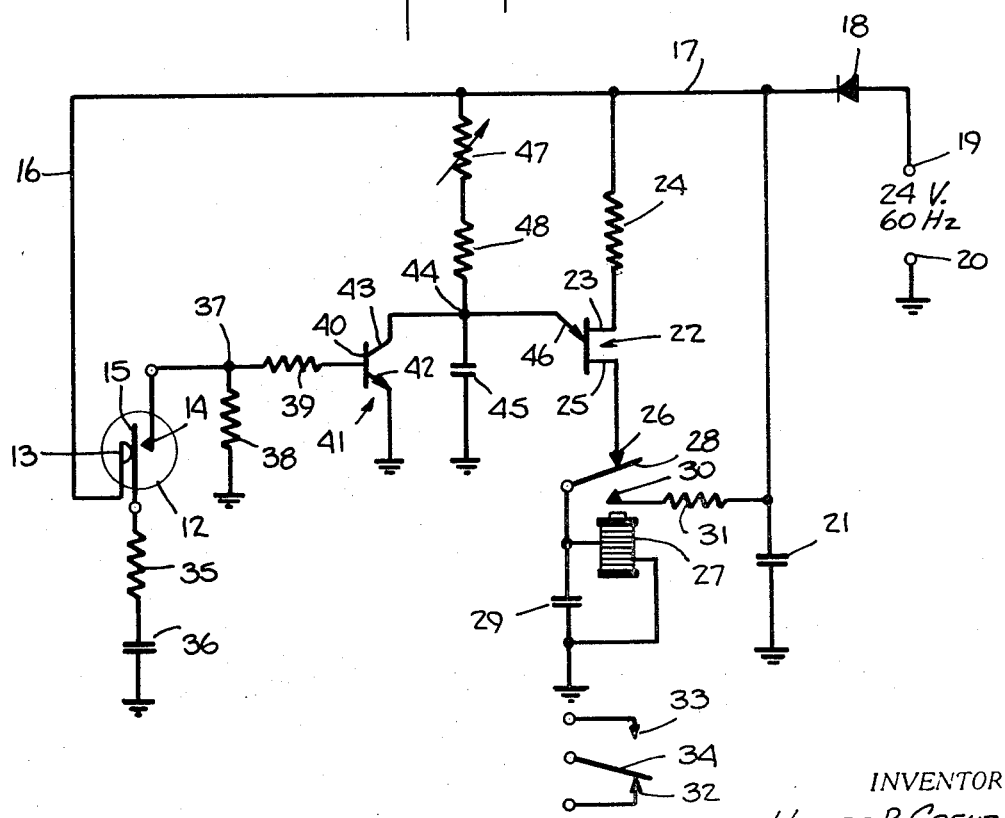
INVENTOR.
WALTER R. CREUZ
BY
Ward McClennen Brooks & Fitzpatrick
ATTORNEYS

APPARATUS FOR DETECTING INTERRUPTION IN THE CYCLIC MOVEMENT OF A MEMBER

The present invention relates to a monitoring device. More particularly, it relates to a device for detecting an interruption in the cyclic movement of a moveable member.

While not limited thereto, the monitoring device of the present invention is particularly suited to supervising the continued normal rotation of an air-to-air energy exchanger of the type normally installed between the exhaust and supply air duct work in a heating, ventilating and/or air conditioning system. In the operation of these wheels, heat, and in some cases moisture, is absorbed from the exhaust air stream and transferred to the supply air stream which is usually made up of fresh air. Up to 90 percent of the normally wasted exhaust energy can be recovered to heat and humidify the fresh air supply. This type of energy recovery system is usually employed in a central heating, ventilating, or air conditioning system. Since its principal function is to provide economy of operation, the auxiliary heating and/or cooling equipment is kept to a minimum. Therefore, if the wheels should stop rotating for any of various reasons, such as a broken drive belt, loose pulley or defective motor, the remaining equipment will have insufficient capacity to maintain the temperature in the building or other environmental enclosure. Therefore, it is important to provide prompt indication of such wheel failure so that appropriate maintenance procedures can be put into operation.

In the copending application of Gerard J. Wendelkin, Ser. No. 34,746, filed May 5, 1970, now abandoned for "Rotation Proving Device," and assigned to the same assignee as the present application, there is described a monitoring device for indicating an interruption in wheel rotation. The device described therein comprises an electromagnetic pickup for developing a voltage signal each time a body of paramagnetic material mounted on the periphery of the air-to-air energy exchange wheel passes through the magnetic field produced by the pickup. A condenser is charged by the signal and discharged through a high-input-impedance amplifier input circuit. Normally, the signals are developed to re-charge the condenser before the charge leaks below a predetermined level at which an output relay is deenergized. When rotation of the wheel is interrupted, the capacitor discharges, the relay is released, and an output signal is produced. While the foregoing device is quite satisfactory under most conditions, it requires a somewhat expensive electromagnetic pickup and is susceptible of the possibility albeit rare, of giving a false indication if the wheel should stop with the paramagnetic body adjacent the pickup.

It is, therefore, an object of the present invention to provide an improved detecting device which is simpler in construction, more economical to produce, and is free from the problem of dead center ambiguity.

In accordance with the present invention, there is provided apparatus for detecting an interruption in the cyclic movement of a moveable member in which a first point on the member repeatedly passes in close proximity to a second point in space, which apparatus comprises in combination a small magnet arranged to be secured to the moveable member at the first point, a magnetically operable switch arranged to be mounted at the second point where, so long as the member continues to move, the switch will be actuated by the magnet each time the magnet passes in close proximity, timing means coupled to the switch and responsive to actuation thereof for starting a timing operation of predetermined duration, the timing means being restarted each time the switch is actuated, the predetermined duration being selected to exceed the maximum interval occurring between successive passages of the magnet past the switch in the absence of an interruption in the movement of the member, and signalling means responsive to the timing means completing a timing operation for providing a manifestation of the interruption.

The invention will be better understood after reading the following detailed description of a presently preferred embodiment thereof with reference to the appended drawings in which:

FIG. 1 is a diagrammatic representation of an air-to-air energy exchange wheel showing a typical arrangement of the magnet and magnetic switch; and FIG. 2 is an electrical schematic diagram of the circuit employed in the detecting device.

The same reference numerals are used throughout the figures of the drawings to designate the same or similar parts.

Referring now to FIG. 1, the energy exchange wheel is designated generally by the reference numeral 10. It is shown with a small magnet 11 mounted on its periphery where, when the wheel 10 rotates, the path of the magnet will be in close proximity to a reed switch 12 mounted adjacent thereto. While not shown in FIG. 1, it is to be understood that suitable means will be coupled to the wheel 10 to impart rotation thereto. The wheel, itself, is constructed in well-known manner.

Referring now to FIG. 2, there is shown the details of the detecting circuit. The reed switch 12 is provided with fixed contacts 13 and 14 and a moveable contact 15. The fixed contact 13 is connected by a lead 16 to a common bus 17 which, in turn, is connected to a source of D.C. voltage. The bus 17 is connected through a rectifier 18, poled as indicated, to an input terminal 19. A second input terminal 20 is connected to ground which functions as a point of reference potential. As shown on the drawing, a 24 volt source of 60 Hertz alternating current may be connected between the terminals 19 and 20.

A smoothing capacitor 21 is connected between the bus 17 and ground. A unijunction transistor 22 has its base 1 electrode 23 connected through a resistor 24 to the bus 17. The base 2 electrode 25 of transistor 22 is connected to a first fixed contact 26 of a relay 27. The armature 28 of relay 27 is connected through a capacitor 29 in parallel with the winding of relay 27 to ground. The relay 27 is provided with a second fixed contact 30 which is connected through a resistor 31 to the junction between capacitor 21 and bus 17. The relay 27 is also provided with a second set of fixed contacts 32 and 33 cooperating with an armature 34. The two armatures 28 and 34 of relay 27 are shown in the drawing in the deenergized condition. When the relay 27 is energized, the armatures 28 and 34 will shift position to contact, respectively, fixed contacts 30 and 33, rather than contacts 26 and 32.

The moveable contact 15 of reed switch 12 is connected to ground through a series arrangement of resistor 35 and capacitor 36. The second fixed contact 14 of the reed switch is connected to the junction 37 between resistors 38 and 39. The other end of resistor 38 is connected to ground while the other end of resistor 39 is connected to the base electrode 40 of a transistor 41. The emitter electrode 42 of transistor 41 is connected to ground while the collector electrode 43 of transistor 41 is connected to the junction 44 between a capacitor 45 and the emitter electrode 46 of transistor 22. The free end of capacitor 45 is connected to ground. A series arrangement of an adjustable resistor 47 and a fixed resistor 48 is connected between the bus 17 and the junction 44.

The operation of the device can now be explained. Assuming that the wheel 10 is placed in operation, the magnet 11 will periodically pass close to the switch 12 attracting the moveable contact 15, causing it to disengage fixed contact 13 and engage fixed contact 14. As is well known, so long as the magnet is adjacent the switch 12, the moveable contact 15 will be in the actuated position. Thus, if the wheel should stop with the magnet 11 adjacent the switch 12, contact 15 will remain in engagement with the fixed contact 14. When, however, the magnet passes from the neighborhood of the switch 12, the moveable contact 15 will be returned to its home or biased position in engagement with fixed contact 13. The actuation of switch 12 will be repeated each time the magnet 11 passes in proximity thereto.

Assuming that the wheel 10 has been placed in motion, the voltage may be applied through a switch, not shown, to the terminals 19 and 20. The rectifier 18 will cause a D.C. voltage to be developed across smoothing capacitor 21 which voltage will appear on bus 17 relative to the point of reference potential or ground. Initially, capacitor 45 will be discharged. When the voltage is applied to terminals 19 and 20, the voltage on bus 17 will initiate a flow of current through resistors 47 and 48 to charge capacitor 45, assuming that the transistor 41 is non-conductive. It will be recognized that resistors 47 and 48 in cooperation with capacitor 45 provide an adjustable timing circuit.

With the reed switch 12 in its normally biased condition, as shown in FIG. 2, a conductive path is provided from the bus 17 through lead 16, the closed contacts of the reed switch, the resistor 35 and the capacitor 36 to ground to charge the latter. Resistor 35 is small enough that capacitor 36 will quickly charge to the voltage on bus 17. When the magnet passes the switch under normal rotation of the wheel 10, the contact 15 will briefly engage fixed contact 14. This will cause the voltage on capacitor 36 to be applied through resistor 35 across resistor 38 to ground. For the time interval that it takes the charge on capacitor 36 to leak off through resistors 35 and 38, a voltage will be applied through resistor 39 to the base electrode 40 of transistor 41 sufficient to cause transistor 41 to conduct and discharge any charge previously developed on capacitor 45. This will reset the timing circuit by eliminating any charge on capacitor 45.

Assuming that the wheel 10 is rotating at normal speed, the transistor 41 will be rendered conductive to discharge capacitor 45 before the voltage thereacross reaches the firing point of unijunction transistor 22.

However, if rotation of the wheel 10 is interrupted, a pulse will no longer be applied to trigger transistor 41 and, therefore, the voltage on capacitor 45 will eventually reach the triggering level of unijunction transistor 22. When transistor 22 is rendered conductive, it permits current to flow through the winding of relay 27 sufficient to energize the latter. At the same time, a charge is supplied to capacitor 29. The charge on capacitor 29 ensures that relay 27 will maintain its energization long enough to cause its armature 28 after leaving contact 26 to engage contact 30. Engagement between armature 28 and contact 30 establishes a holding circuit through resistor 31 to maintain the relay in its energized condition. At the same time, the armature 34 will leave contact 32 and engage contact 33. The terminals associated with contacts 32, 33 and 34 may be connected to appropriate signalling or control circuitry, in known manner.

If the wheel 10 should cease rotation with magnet 11 adjacent reed switch 12, the contact 15 will move into engagement with fixed contact 14 applying a voltage pulse to the transistor 41. This, as explained above, will reset the timing circuit. However, the charge on capacitor 36 will quickly dissipate through resistors 35 and 38 rendering transistor 41 non-conductive and permitting the charging of capacitor 45. After a predetermined interval, the charge on capacitor 45 will reach the triggering point of transistor 22 energizing relay 27 to signal an interruption.

While not intended to limit the scope of the present disclosure, the following typical circuit constants are given for the circuit of FIG. 2 by way of example.

| Resistors Ref. No. | Ohms | Capacitors Ref. No. | Mfd. |
| --- | --- | --- | --- |
| 24 | 27 | 21 | 100 |
| 31 | 180 | 29 | 100 |
| 35 | 10,000 | 36 | 1 |
| 38 | 100,000 | 45 | 100 |
| 39 | 10,000 | | |
| 47 | 50,000 adjustable | | |
| 48 | 2,200 | | |

| | | |
| --- | --- | --- |
| Rectifier 18 | = | 1N2071 |
| Transistor 22 | = | 2N489A |
| Transistor 41 | = | 2N2192 |
| Relay 27 | = | 350 milliwatt |
| Reed Switch 12 | — | "C" Type |

While only one magnet has been shown on the wheel 10, a plurality may be employed spaced circumferentially thereabout. The choice of number of magnets will depend on the normal speed of rotation of the wheel and on the time constant of the resistance-capacitance timing circuit. The values of resistors 47 and 48 and capacitor 45 may be altered in known manner to establish the desired time constant range.

Having described the presently preferred embodiment of the invention, it will be apparent to those skilled in the art that various changes in construction may be introduced without departing from the true spirit of the invention as defined in the appended claims.

What is claimed is:

1. Apparatus for detecting an interruption in the rotation of an air-to-air energy exchange wheel comprising in combination, a small magnet arranged to be secured to the periphery of said wheel, a reed switch having first and second fixed contacts and one magnetically moveable contact, the moveable contact being biased to normally engage said first fixed contact, but being actuable by the magnetic field from said magnet when the magnet is in close proximity to said switch to disengage said first fixed contact and engage said second fixed contact, means for counting said reed switch adjacent the periphery of said wheel in close proximity to the path of said magnet, a source of D.C. voltage connected between said first fixed contact and a point of reference potential, means for storing a voltage charge connected between said moveable contact and said point of reference potential, a resistor connectible in series between said means for storing a voltage charge and said source of reference potential by said moveable contact upon actuation thereof to provide a first resistance-capacitance timing circuit, a second resistance-capacitance timing circuit connected between said source of voltage and said point of reference potential, a current control device coupled across said capacitance for discharging said capacitance when said device is conductive, said device having control means for controlling the conductivity thereof, means connecting said second fixed contact to said control means, a current switching device, a signalling device, means connecting said signalling device under the control of said current switching device to a source of energizing current, and means connecting said capacitance to said current switch device for causing said switching device to conduct when the voltage across said capacitance exceeds a predetermined magnitude.

\* \* \* \* \*